(12) United States Patent
VanAntwerp et al.

(10) Patent No.: US 7,634,569 B2
(45) Date of Patent: Dec. 15, 2009

(54) MATCH MAKING BASED ON PROXIMITY MEASURES BETWEEN DEVICES

(75) Inventors: Mark D. VanAntwerp, Redmond, WA (US); Boyd C. Multerer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 807 days.

(21) Appl. No.: 10/421,073

(22) Filed: Apr. 23, 2003

(65) Prior Publication Data

US 2004/0215756 A1 Oct. 28, 2004

(51) Int. Cl.
*G06F 15/16* (2006.01)

(52) U.S. Cl. ...................................... 709/227

(58) Field of Classification Search .................. 709/205, 709/227, 228; 463/25, 29, 42
See application file for complete search history.

(56) References Cited

U.S. PATENT DOCUMENTS

| 6,012,096 | A | 1/2000 | Link et al. | |
| 6,169,988 | B1* | 1/2001 | Asakura | 707/10 |
| 6,468,160 | B2 | 10/2002 | Eliott | |
| 6,542,468 | B1* | 4/2003 | Hatakeyama | 370/238 |
| 6,712,704 | B2 | 3/2004 | Eliott | |
| 6,769,989 | B2 | 8/2004 | Smith et al. | |
| 6,939,234 | B2* | 9/2005 | Beatty | 463/42 |
| 7,018,295 | B2* | 3/2006 | Sakaguchi et al. | 463/42 |
| 7,278,921 | B1* | 10/2007 | Fujisawa et al. | 463/42 |
| 7,421,471 | B2* | 9/2008 | Van Datta | 709/205 |
| 7,460,863 | B2* | 12/2008 | Steelberg et al. | 455/419 |
| 2001/0044339 | A1* | 11/2001 | Cordero et al. | 463/42 |
| 2002/0002074 | A1* | 1/2002 | White et al. | 463/25 |
| 2002/0143918 | A1* | 10/2002 | Soles et al. | 709/223 |
| 2003/0027639 | A1* | 2/2003 | Peterson et al. | 463/42 |
| 2003/0046022 | A1 | 3/2003 | Silverman | |
| 2003/0148812 | A1* | 8/2003 | Paulsen et al. | 463/42 |
| 2004/0116186 | A1* | 6/2004 | Shim et al. | 463/42 |
| 2004/0162137 | A1 | 8/2004 | Eliott | |
| 2007/0038755 | A1* | 2/2007 | Sullivan et al. | 709/226 |

FOREIGN PATENT DOCUMENTS

| DE | 10035133 | 1/2002 |
| GB | 2375006 | 10/2002 |
| JP | 11015715 (A) | 1/1999 |
| JP | 11319319 (A) | 11/1999 |

OTHER PUBLICATIONS

Webopedia—traceroute—http://www.webopedia.com/TERM/t/traceroute.html.*
Yan Chen et al., "On the Stability of Network Distance Estimation," Performance Evaluation Review, vol. 30, No. 2, Sep. 2002, p. 21-30.
T.S. Eugene NG et al., "Predicting Internet Network Distance with Coordinates-Based Approaches," IEEE INFOCOM 2002, pp. 170-179.
English language Title and Abstract for DE 10035133 Foreign Patent Document, 1 page, Jan. 31, 2002.

* cited by examiner

*Primary Examiner*—Krisna Lim
(74) *Attorney, Agent, or Firm*—Lee & Hayes, PLLC

(57) ABSTRACT

In accordance with one aspect of match making based on proximity measures between devices, a record of distances between groups of network addresses is maintained. This record is then used as a basis for selecting an ordering for online game sessions that is to be returned to a computing device requesting information regarding current online game sessions.

41 Claims, 7 Drawing Sheets

200

| IP ADDRESS | BUCKET | INTERNET PROVIDER |
|---|---|---|
| 192.16.32.x | 2 | 24 |
| 114.32.16.x | 8 | |
| ⋮ | ⋮ | ⋮ |
| 84.16.52.19 | 18 | 1 |

| BUCKET | BUCKET | DISTANCE |
|---|---|---|
| 1 | 1 | 0 |
| 1 | 2 | 25 |
| 1 | 3 | 84 |
| ⋮ | ⋮ | ⋮ |

*Fig. 4*

MATCH MAKING BASED ON PROXIMITY MEASURES BETWEEN DEVICES

TECHNICAL FIELD

This invention relates to online gaming, and particularly to match making based on proximity measures between devices.

BACKGROUND

Traditionally, gaming systems with a dedicated console were standalone machines that accommodated a limited number of players (e.g., 2-4 players). Personal computer-based gaming grew in popularity in part due to the ability to play games online with many remote players over the Internet. Thus, one trend for dedicated gaming consoles is to provide capabilities to facilitate gaming over a network, such as Internet-based online gaming.

One problem encountered in online gaming, whether personal computer-based or dedicated gaming console-based, is network latency. When users of two different devices are playing a game against one another online, various delays may be encountered due to the sending of data between the devices. These delays can adversely affect game play, such as by making the game appear to be slow or "sluggish" to one or more of the users. Given the way in which network latency can adversely affect game play, it would be beneficial to reduce network latency among devices for online gaming.

The match making based on proximity measures between devices described below helps solve these and other problems.

SUMMARY

Match making based on proximity measures between devices is described herein.

In accordance with one aspect, a record of distances between groups of network addresses is maintained. An ordering for online game sessions that is to be returned to a computing device requesting information regarding current online game sessions is then selected, with the ordering being based at least in part on the record of distances. Such current online game sessions may be short-lived sessions (e.g., ending when all computing devices leave the session) or alternatively may be longer-lived sessions such as tournaments (e.g., enduring for longer durations of time, even though no computing devices may be playing the game at particular times in that duration).

BRIEF DESCRIPTION OF THE DRAWINGS

The same numbers are used throughout the document to reference like components and/or features.

FIG. 3 illustrates an exemplary mapping table.

FIG. 4 illustrates an exemplary proximity table.

DETAILED DESCRIPTION

Figure 1:
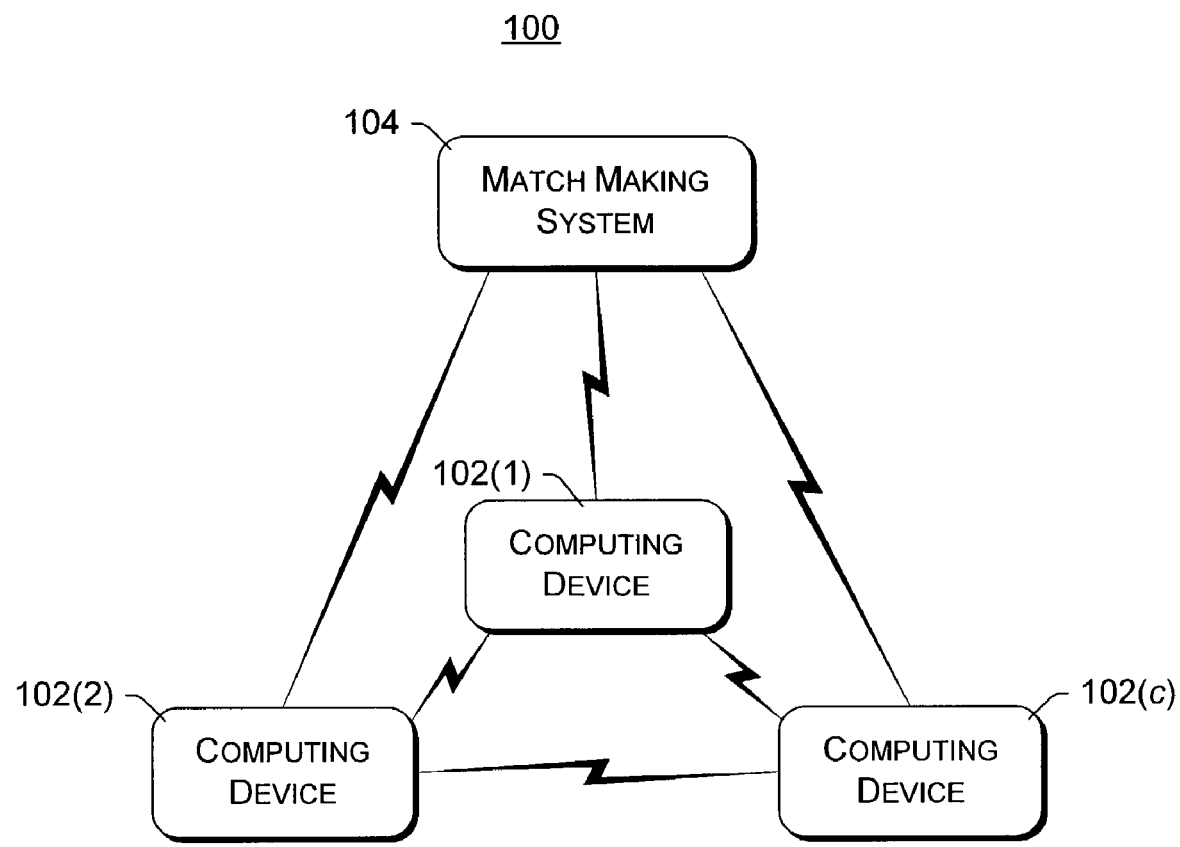
FIG. 1 is a block diagram of an exemplary environment in which the match making based on proximity measures between devices can be used.

FIG. 1 is a block diagram of an exemplary environment 100 in which the match making based on proximity measures between devices can be used. Multiple computing devices 102(1), . . . , 102(c) are coupled to a match making system 104. The coupling between devices 102 and system 104, as well as among devices 102, can be any of a variety of couplings allowing communication between system 104 and each of devices 102 and/or between devices 102. In one implementation, the coupling includes the Internet, and may also optionally include one or more other networks (e.g., a local area network (LAN) or wide area network (WAN)). For example, each of computing devices 102 may be situated on a home-based LAN and each home-based LAN coupled to system 104 via the Internet. The couplings can be implemented using any of a variety of network types and technologies, including wire and/or wireless networks.

Computing devices 102 allow their respective users to play games with one another. Online gaming typically refers to two or more devices communicating with one another to allow the user(s) of the devices to play games with one another. This communicating is typically performed over the Internet, but could alternatively be over other networks as well (in place of or in addition to the Internet).

Match making system 104 maintains information about multiple game sessions being hosted by the computing devices 102, allowing players to search for game sessions, create new game sessions, join game sessions, quit game sessions, and obtain information used by the computing devices to communicate data to one another. The hosting device of a game session is the device responsible for initiating a game session, such as by having match making system 104 (or alternatively some other device) create a new game session. Alternatively, the hosting device may be selected or determined in some other manner. For example, the hosting device may be selected randomly or according to some other criteria.

In some implementations, a game session refers to one instance of a game title including one or more players. Such game sessions are also referred to herein as short-lived game sessions. When all players of the game session have ended the session (e.g., quit the game session, logged out of system 104, powered-down their devices, etc.), then the game session ends. A game session can include multiple rounds of play, or alternatively a new game session may be created for each round of play.

In other implementations, game sessions may persist over longer durations, such as days, weeks, months, or even years. Such game sessions are also referred to herein as longer-lived game sessions or persistent game sessions. One example of such a persistent game session is a tournament. In a tournament, multiple matches among the various players occur over a typically long period of time. Each match can be viewed as an individual game play session which is part of the tournament game session. The tournament game session is not over until all of the individual game play sessions are completed. Thus, it is possible that there may be times in the tournament game session when no individual game play sessions are being played (e.g., none of the computing devices in the tournament game session may be playing the game, or may not even be powered on).

As used herein, game sessions refer to both such short-lived game sessions and such persistent game sessions, as well as individual game play sessions of a persistent game session.

Information regarding multiple game sessions for each of multiple different game titles can be maintained by system 104 concurrently. Players can leave (quit) a game session and join a game session. Once the session reaches a particular point in the gameplay, the ability to join the session can be restricted, or alternatively players may be able to join and leave the game session at will during gameplay, so that the players at the end of the game session can be different than the players at the beginning of the game session. Restrictions on the ability to join and leave the game session can vary by game title, based on the desires of the game title designer.

When a player using a computing device joins a game session, that computing device is also referred to as joining the game session. The device being used by each player that is playing a game session is also referred to as a member of or part of the game session.

Computing device 102 can be a dedicated game console, a game console incorporating additional functionality (e.g., digital video recording functionality so that it can operate as a digital VCR, channel tuning functionality so that it can tune and decode television signals (whether they be broadcast signals, cable signals, satellite signals, etc.), and so forth), a desktop PC, a workstation, a portable computer, a cellular telephone, an Internet appliance, a server computer, etc. Additionally, different types of devices 102 may use match making system 104 concurrently. For example, a user on a dedicated game console may join a game session and play against a user on a portable computer, or a user on a dedicated game console manufactured by one manufacturer may join a game session and play against a user on a dedicated game console manufactured by another manufacturer.

One specific example implementation of environment 100 of FIG. 1 can be found in co-pending U.S. patent application Ser. No. 10/170,003, entitled "Security Gateway for Online Console-Based Gaming", filed Jun. 10, 2002, which is hereby incorporated by reference.

Figure 2:
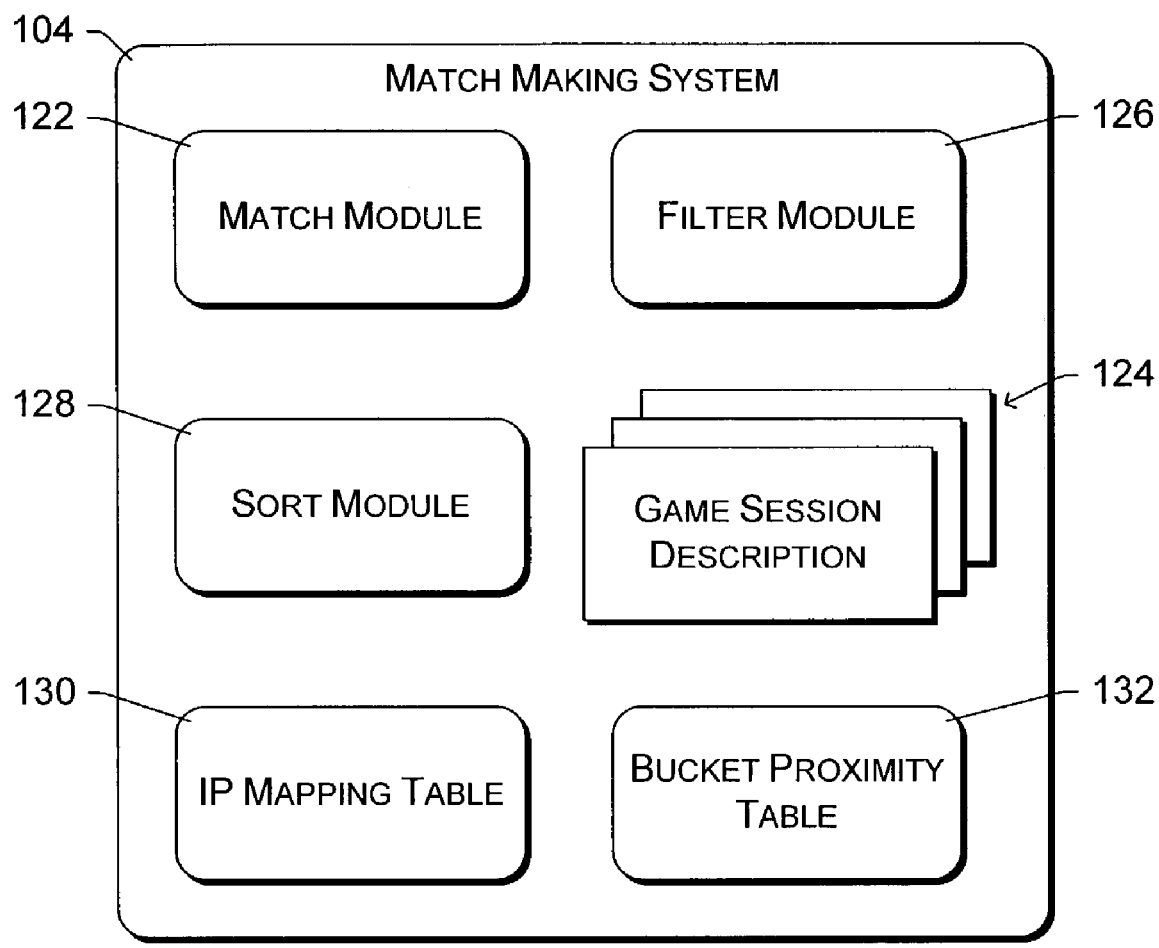
FIG. 2 is a block diagram illustrating an exemplary match making system in additional detail.

FIG. 2 is a block diagram illustrating an exemplary match making system 104 in additional detail. Match making system 104 includes a control module (match module 122) and records 124 describing current online game sessions. Such current online game sessions include both short-lived and persistent game sessions. Match module 122 receives requests regarding creating, joining, quitting, searching, etc. game sessions. These requests are received from requesting devices, such as computing devices 102 of FIG. 1. When such a request is received, match module 122 interacts with the other components of match making system 104 as appropriate to carry out the received request.

Match making system 104 maintains multiple records 124 storing information describing the various game sessions that are currently being managed by match making system 104. As there are typically multiple online game sessions at any given moment, match making system 104 typically includes multiple descriptions at any given moment. The game sessions managed by match making system 104 are typically those game sessions that are created by match making system 104. Some game sessions managed by match making system 104 may be open and thus additional players can join the sessions, while other game sessions may be closed and thus additional players cannot join the sessions. The records 124 can be maintained using any of a variety of data structures. In one exemplary implementation, the information regarding each game session is stored as an entry in one of one or more tables.

Match making system 104 is designed to facilitate establishing of game sessions between or among computing devices. In most of the discussions herein, match making system 104 is described as managing game sessions but not managing the transfer of game data between or among the member devices of the game session. Rather, the computing devices transfer the game data during gameplay between or among themselves, or via another server device (not shown in FIG. 2). Alternatively, some game data transfer may occur via match making system 104.

When multiple computing devices are participating in an online game session, one of the devices is referred to as the host of the game session (and also as the host device). In one implementation, the host of the game session is the device that had the game session created. In other implementations, other criteria are used to determine the host of the game session. The host of the game session is typically the device used in determining proximity to another device that may join the game session, as discussed in more detail below, although other devices that are part of the game session may alternatively be used.

A variety of different information can be maintained in records 124 for each game session. In one implementation, this information includes at least a description of the game being played in the game session and an identifier of the host of the game session.

The description of the game includes the title of the game as well as one or more attributes of the game. An attribute is a piece of data associated with a game session, or a player in a game session. The attributes of the game can vary by game based on the desires of the game title designer. For example, the attributes may indicate the skill level of the player that initiates creating the new session, the desired skill level of other players that may join the new session, the game location where the play will occur (for example, during the day, at night, at a particular stadium, in a particular city, on a particular track, weather conditions, etc.), objects to be used during play (for example, types of cars, types of airplanes or spaceships, etc.), characteristics of the various characters in the game (for example, special powers that are available, magical spells that are available, etc.), and so forth. Additionally, rather than including the game title, the game title may be inherent in the request (for example, a different request type may be used for each game title).

The identifier of the host of the game session is an address structure of the host computing device. The address structure includes sufficient information to allow proximity measures as discussed herein to be generated. The identifier may be an IP address (e.g., conforming to Internet Protocol Version 4 (IPV4) or Internet Protocol Version 6 (IPv6)), or alternatively network identifiers or addresses in other formats.

In one implementation, this address structure is referred to as a fully qualified address (XNADDR) for the host computing device. The fully qualified address of the host computing device includes sufficient information to allow other computing devices to access the host computing device even though the host computing device may be situated behind a network address translation (NAT) device, such as a network router.

One example of a fully qualified address for a computing device includes: the Ethernet MAC address for the computing device; the local IP (Internet Protocol) address of the computing device (this is the IP address that the computing device believes it has, and may be different than the IP address from which the match making system receives data packets from the computing device (e.g., due to a NAT device, such as a router, situated between the computing device and the match making system (or an intermediary acting on behalf of the match making system)); the IP address and port from which the match making system (or intermediary) receives data packets from the computing device (this may be the same as the local IP address of the computing device, or alternatively different (e.g., the address of a NAT device)); a logical device number, (an identifier assigned to the match making system (or intermediary) to uniquely identify the match making system (or intermediary) within a cluster of multiple match making systems (or intermediaries)); a Security Parameters Index (SPI) value (e.g., $SPI_1$ and/or $SPI_2$); and a computing device id. The contents of the fully qualified address can be determined based on information embedded in data packets received from the computing device as well as information received in establishing a secure connection between the computing device and the match making system (or intermediary).

The IP address from which the match making system (or intermediary acting on behalf of the match making system) receives data packets from a computing device is used in determining proximity measures for that computing device, as discussed in more detail below. The IP address is typically assigned by an Internet Service Provider (ISP), and may change over time. This IP address is, for example, the IP address from which data packets are sent over the Internet by the computing device. Additionally, multiple devices may share the same IP address (e.g., multiple devices may be situated on a LAN with a router situated between the Internet and the LAN, and the IP address of the router on the Internet is the IP address from which data packets from all of the devices on the LAN are sent).

Match making system 104 also includes a filter module 126 that filters out game sessions that do not satisfy the criteria specified by a request to join a game session. During operation, when a device desires to join a game session (e.g., in response to a user request to join a game session), whether a short-lived or longer-lived game session, the device communicates a request to match making system 104 for descriptions and/or identifiers of current game sessions that may be joined. Match making system 104 returns descriptions and/or identifiers to the requesting device for one or more of the current game sessions, and the device can select one of the game sessions to join. The device can select one of the game sessions automatically (e.g., as indicated by software running on the device), or alternatively can select one of the game sessions in response to user input at the device (e.g., a user selecting one of the game sessions from a display listing the various game sessions).

Match making system 104 identifies a set of the descriptions 124 to return to such a requesting device. Filter module 126 operates to select only descriptions 124 for the set to be returned to the requesting device that satisfy criteria specified by the requesting device. For example, the requesting device may specify that the game session should include only players of certain skill levels, or only particular race tracks, or only particular stadiums, and so forth. Additionally, filter module 126 operates to select only descriptions 124 for the set to be returned to the requesting device that are currently available for joining (e.g., if a game session is full of players and no more can currently join, then that game session is not returned as part of the set to the requesting device).

One or more of those descriptions 124 that satisfy the criteria specified by the requesting device are returned to the requesting device. In certain embodiments, match making system 104 limits the number of descriptions 124 that are returned to the requesting device. In one implementation, match making system 104 will return no more than fifty descriptions 124 to the requesting device, although different limits may be imposed in different implementations. By limiting the number of descriptions 124 that are returned to the requesting device, the amount of network bandwidth consumed in sending the descriptions as well as the amount of data to be presented (e.g., displayed) at the requesting device can be reduced.

Given a set of descriptions 124 that are to be returned to the requesting device, sort module 128 sorts the descriptions in the set so that the descriptions can be presented by the requesting device in a particular (sorted) order. The descriptions can be sent to the requesting device in this sorted order, or alternatively an indication of the proper order may be sent along with the descriptions and they can be assembled in their sorted order at the requesting device.

Sort module 128 sorts the descriptions according to proximity measures generated for each of the game sessions. A proximity measure for a game session represents an approximate distance between the requesting device and the host device for that game session. Alternatively, the distance may be between the requesting device and another device that has joined the game session (e.g., some device other than the host device that is part of the game session). In certain embodiments, sort module 128 works from the assumption that data transfers between devices that are close to one another are generally quicker than data transfers between devices that are farther away from one another. Thus, the predicted latency of data transfers between devices is generally lower for devices in closer proximity to one another.

By sorting the game descriptions according to proximity measures, game sessions hosted by devices that are closer to the requesting device (and thus game sessions for which the predicted latency of data transfers between the requesting device and other devices that are part of the game session is lower) can be presented more prominently to the user of the requesting device. For example, such game sessions can be displayed at the beginning of a list of game session descriptions. The user is thus more likely to choose these game sessions, thereby improving the user experience.

The proximity measure can be generated in a variety of different manners. One way in which the proximity measure for two devices can be generated is by determining an approximate geographic location (e.g., in terms of latitude and longitude) of each of the devices. This location information can be obtained in different manners. For example, a user may have a geographic location associated with him or her that is recorded when the user registers or logs on to use the services of match making system 104. By way of another example, certain organizations or companies generate information that maps IP addresses to geographic locations. The IP address of the host device is known from the game session description (e.g., in the XNADDR that is part of the description), and the IP address of the requesting device is also known (e.g., by examining an XNADDR for the requesting device, or by examining the source IP address for data packets received from the device). Such information mapping IP addresses to geographic locations can be obtained, for example, from Digital Envoy of Norcross, Ga.

In certain embodiments, match making system 104 maintains an IP mapping table 130. The information mapping IP addresses to geographic locations is stored in mapping table 130, thereby allowing sort module 128 to determine the geographic locations of devices based on their IP addresses. Given the geographic locations for two devices, a distance between the two devices can be readily calculated in any of a variety of manners. For example, it may be assumed that the devices are located on a sphere (the earth), and thus a spherical distance between the two devices can be calculated. By way of another example, it may be assumed that the devices are located on a plane (e.g., a map of the United States), and thus a straight line distance between the two devices can be calculated. This calculated distance between the two devices is then used as the proximity measure for the two devices.

Another way in which the proximity measure for two devices can be generated is based on their geographic locations, however, rather than maintaining the geographic location of each IP address, IP addresses are grouped together into multiple "buckets" or "groups". The number of buckets that IP addresses are grouped into can vary and is a design choice. In one implementation, IP addresses in the United States are separated into approximately 150 buckets, although different numbers of buckets (greater than or less than 150) could alternatively be used. For example, in another implementation IP addresses in the United States are separated into approximately six buckets.

A geographic location is also associated with each of these buckets. In one implementation, the approximate geographic center of the bucket is used as the geographic location associated with the bucket, although different locations could alternatively be used.

The buckets for a particular geographic region (e.g., the United States) can be generated in a variety of different manners. In one implementation, the buckets are generated by separating the geographic region into a number of sub-regions. These sub-regions can be based on different factors, such as human population centers, or physical area. For example, the geographic region may be separated into approximately 150 separate physical areas, each of which is a bucket. By way of another example, each of the top 150 human population centers in the geographic region may serve as a bucket.

In another implementation, IP addresses are assigned to buckets that are centered around "IP population" centers, where the "IP population" refers to a number of IP addresses. Large concentrations of IP addresses are identified (e.g., the 150 largest concentrations) and these concentrations are used as buckets. A geographic area is associated with each of these buckets, and each such geographic area includes those physical locations having IP addresses in that bucket. The geographic area may be defined by a particular geometric shape, such as a circle. Any IP address that is not initially in any of the buckets is then assigned to the closest bucket (e.g., based on the distances to the centers of the buckets). The geometric shape may be altered to include such additional IP addresses, or alternatively may not be altered.

In another implementation, the geographic region that is to be separated into multiple buckets is initially associated with a single bucket. IP addresses are then added to this initial bucket until the bucket contains a threshold amount of IP addresses. This threshold amount can vary, and in one implementation is the number of buckets that are desired to be used divided by the total number of IP addresses to be assigned to those buckets. When the threshold amount of IP addresses is reached, the bucket is split into two buckets. This split can be accomplished using any of a variety of splitting heuristics, and in one implementation is accomplished so that approximately one-half of the IP addresses in the pre-split bucket is in each of the post-split buckets. Additional IP addresses are then added to each of these two post-split buckets by assigning each additional IP address to the closest bucket (e.g., based on the distances to the centers of the buckets). When one of these post-split buckets contains the threshold amount of IP addresses, that bucket is split. This adding of IP addresses and splitting of buckets continues until all of the IP addresses to be assigned are assigned to a bucket.

In certain embodiments, match making system 104 maintains the bucket information in IP mapping table 130. IP mapping table stores mappings of IP addresses to buckets, thereby allowing sort module 128 to determine the buckets that devices are assigned to based on their IP addresses. Match making system 104 also maintains a bucket proximity table 132 that identifies the distance between two buckets. The distance between two buckets is based on the geographic location associated with each of the two buckets (e.g., their approximate geographic centers), and can be calculated in a variety of manners (e.g., analogous to the discussion above regarding spherical distances, straight line distances, and so forth).

FIG. 3 illustrates an exemplary IP mapping table 200. IP mapping table 200 may be, for example, table 130 of FIG. 2. As illustrated in table 200, IP addresses 202 are mapped to particular buckets 204. The value x in the IP addresses 202 indicate any valid integer (e.g., ranging from 0 to 255). Thus, as seen in table 200, individual IP addresses can be mapped to buckets, or ranges of IP addresses can be mapped to buckets. Alternatively, IP mapping table 200 may include "from" and "to" columns to identify ranges of IP addresses.

IP mapping table 200 also includes an Internet provider column 206. In some situations, match making system 104 may have knowledge of the ISP that issues a particular IP address or range of addresses, and in such situations includes the information in Internet provider column 206. Sort module 128 can then, use this information in generating proximity measures. In one implementation, sort module 128 assumes that two devices that are in the same bucket and have received their IP addresses from the same ISP are in closer proximity than two devices that are in the same bucket but have received their IP addresses from different ISPs. Sort module 128 thus adjusts the proximity measure when two devices that are in the same bucket have received their IP addresses from the same ISP to reflect a closer proximity. This adjustment may be a fixed value (e.g., a reduction of ten in the proximity measure) or a dynamic value (e.g., reduce the proximity measure by 90%).

Alternatively, in other implementations, sort module 128 assumes that two devices that have received their IP addresses from the same ISP are in closer proximity than two devices that have received their IP addresses from different ISPs. Sort module 128 thus adjusts the proximity measure when two devices have received their IP addresses from the same ISP to reflect a closer proximity. This adjustment is made by sort module 128 regardless of whether the two devices are in the same bucket, and regardless of whether the way in which the proximity measure for the two devices is generated uses buckets.

FIG. 4 illustrates an exemplary proximity table 250. Proximity table 250 may be, for example, bucket proximity table 132 of FIG. 2. As illustrated in table 250, two bucket columns 252 and 254 are used, and a distance column 256 includes a value representing the distance between the two identified buckets. These distances are used for relative comparisons when performing the sorting described herein, so the distances may be in any units. For example, the distance may be measured in miles or kilometers, or alternatively in some other abstract or arbitrary unit. It should be noted that storage space can be reduced (e.g., by approximately one-half) by taking advantage of the typically symmetric nature of table 250. For example, the distance between buckets 2 and 3 are the same regardless of which bucket is identified in column 252 and which is identified in column 254. Thus, the difference need only be stored once. In alternate embodiments, different network or environment variables may cause the values to not be symmetric. For example, for some reason the distance from bucket 2 to bucket 3 may be different than the distance from bucket 3 to bucket 2. If the values are not symmetric, then both differences (or some indication of both differences) would be stored.

Yet another way in which the proximity measure for two devices can be generated is a hybrid model that is partially based on their geographic locations but also accounts for different data transfer rates along parts of the network. Some networks, including the Internet, have different portions that are capable of transferring data at different speeds. For example, one or more Internet "backbone" networks handle the major traffic on the Internet and employ high-speed transmission paths. Data can typically be transferred between two geographic locations that are close to an Internet backbone network faster than between two geographic locations that are farther from Internet backbone networks.

The hybrid model attempts to account for these speed variances by determining the proximity measure for two devices as follows. The geographic distance (e.g., spherical distance or straight line distance as discussed above) between each device and the closest geographic point at which data from the device can be transmitted on an Internet backbone network is identified. A backbone distance between these two points on the Internet backbone networks is also identified. The two geographic distances (between the devices and the Internet backbone networks) are then added to the backbone distance to obtain the distance between the two devices. In this model, the backbone distance is less than what the geographic distance (e.g., spherical distance or straight line distance as discussed above) would be between the two points. For example, the backbone distance between two points may be one-half of what the geographic distance between the two points would be.

It should be noted that, with reference to all of the manners in which the proximity measure for two devices can be generated as discussed above, sending data packets back and forth between the two devices is not necessary. Direct communication between the two devices is not necessary to generate the proximity measure for two devices. For example, no test messages need to be sent between the two devices, nor is the use of any protocols involving ping and response packets between the two devices needed. Rather, the proximity measure is generated by the match making system.

Regardless of the way in which the proximity measure is calculated, the calculated proximity measure is used as a basis for sorting the set of game sessions as filtered (those sessions that match the criteria provided by, the requesting device). The calculated proximity measure is one sort criteria that can be used, and additional sort criteria can also be applied in sorting the set of game sessions. Examples of such additional sort criteria include: moving those game sessions having the most vacancies (having the largest numbers of users that can join) to the beginning of the set (or alternatively to the ending of the set), moving those game sessions having the most players to the ending of the set (or alternatively to the beginning of the set), prioritizing older game sessions over newer game sessions, ranking game sessions based on how closely they match optional search criteria such as a preferred style of game play or tournament preferences, and so forth.

The various sort criteria can be applied to the set of game sessions in a variety of different orders. In one implementation, where there are a small number of buckets (e.g., six buckets), the calculated proximity measure is applied as the first sort criteria, and is followed by one or more of the other criteria. In another implementation, where there are a large number of buckets (e.g., 150 buckets), the calculated proximity measure is applied as the last sort criteria.

Additionally, in some embodiments, multiple layers (or levels) of buckets can be used. In such embodiments, IP addresses are assigned to a particular bucket in each of these layers. These different bucket layers can then be used as different sort criteria. For example, assume that a first bucket layer has six buckets and a second bucket layer has 150 buckets. The first bucket layer can be applied as the first sort criteria, then one or more of the other sort criteria discussed above can be applied, and then the second bucket layer can be applied as the last sort criteria.

Figure 5:
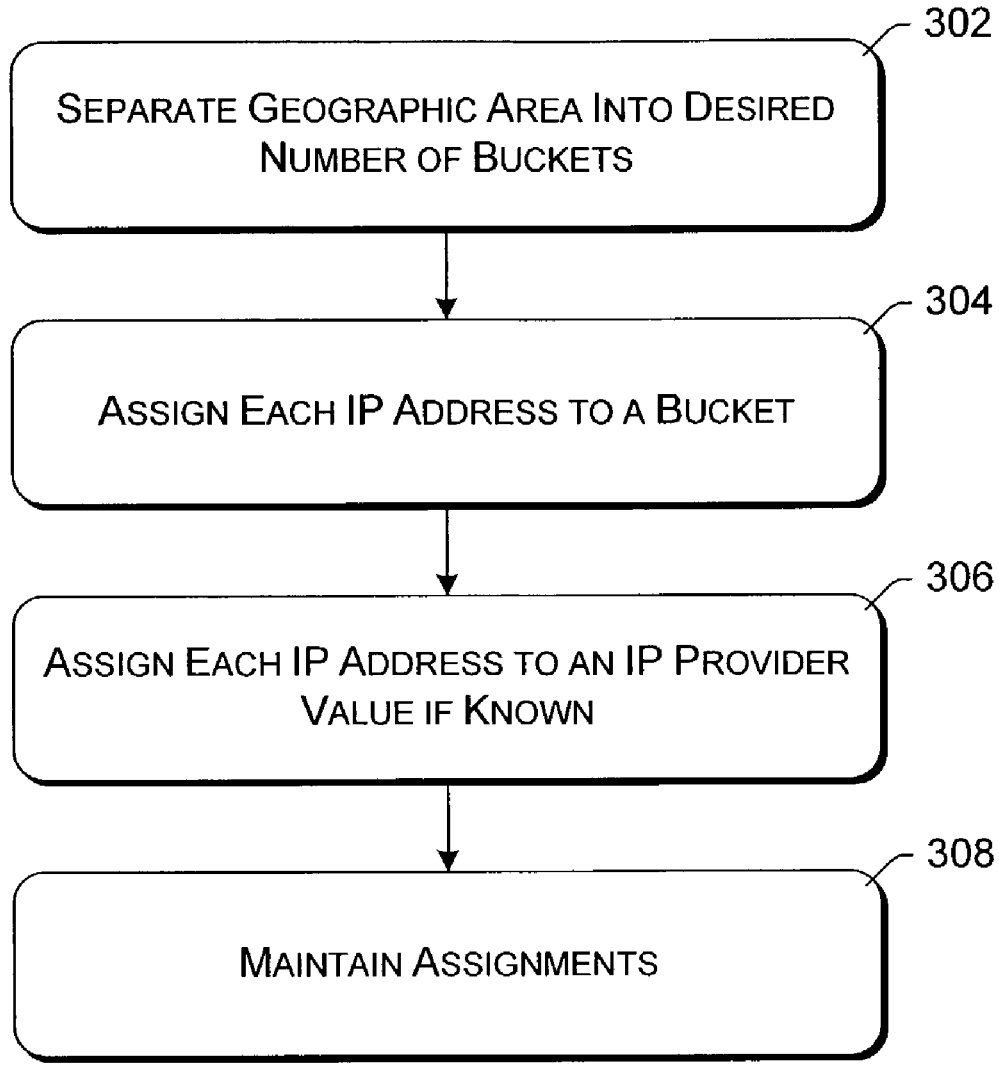
FIG. 5 is a flowchart illustrating an exemplary process for storing information to be used in generating proximity measures for devices.

FIG. 5 is a flowchart illustrating an exemplary process 300 for storing information to be used in generating proximity measures for devices. Process 300 can be performed in software, firmware, hardware, or combinations thereof.

Initially, the geographic area in which the devices exist (e.g., the entire world, or one or more particular countries) is separated into the desired number of buckets (act 302), and each IP address is assigned to one of these buckets (act 304). Additionally, each IP address for which the provider of the IP address is known is assigned an Internet provider value (306). These assignments or mappings are then maintained (act 308). For example, these assignments or mappings can be maintained in a table 200 of FIG. 3.

Figure 6:
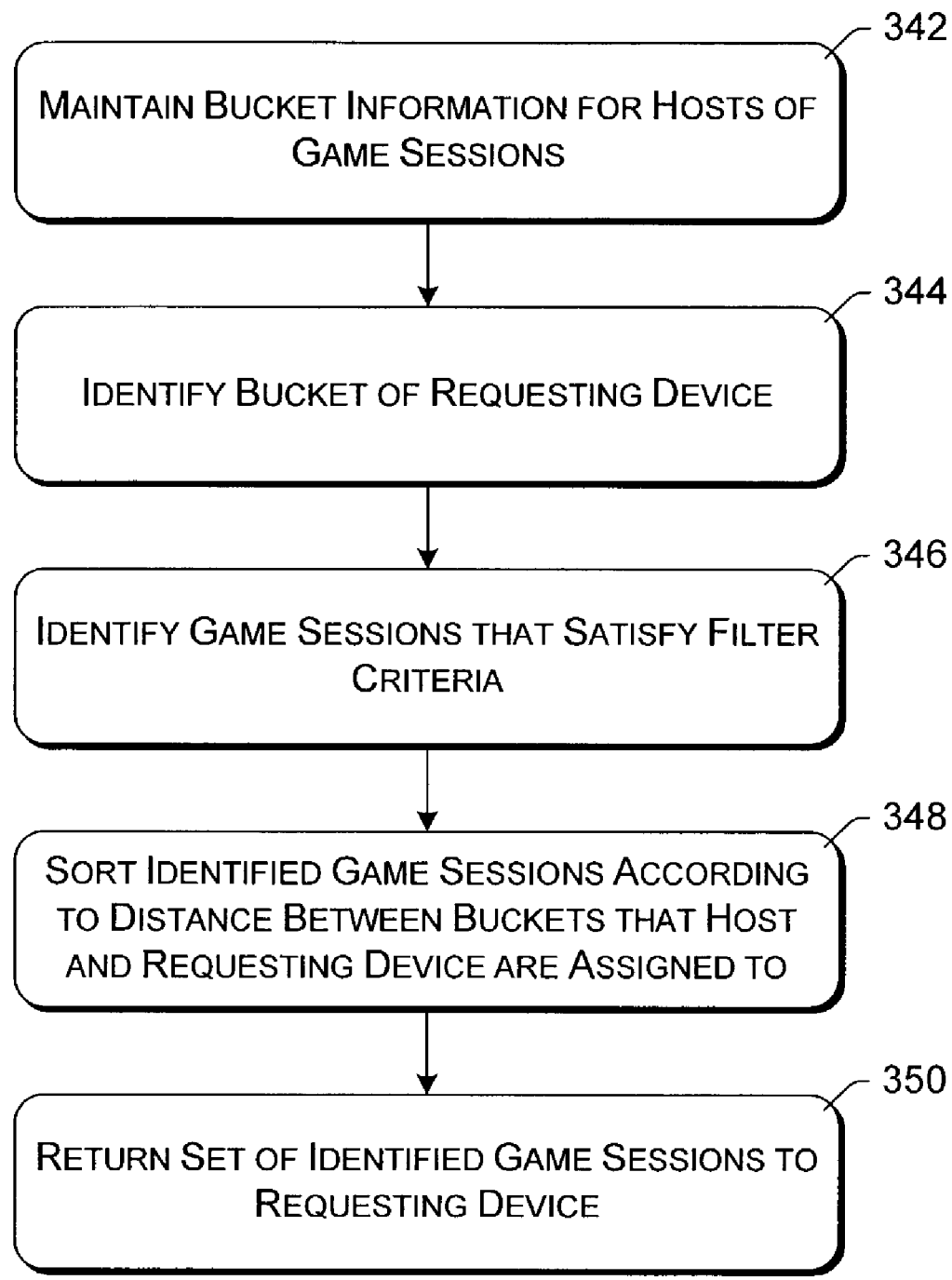
FIG. 6 is a flowchart illustrating an exemplary process for matching and sorting game sessions.

FIG. 6 is a flowchart illustrating an exemplary process 340 for matching and sorting game sessions. In one implementation, process 340 is performed by match making system 104 of FIG. 2. Process 340 can be performed in software, firmware, hardware, or combinations thereof.

Initially, the bucket(s) that hosts of game sessions are assigned to is maintained (act 342). The bucket that the requesting device is assigned to is identified (act 344) and the game sessions that satisfy any filter criteria provided by the requesting device are identified (act 346). A set of the identified game sessions are then sorted according the distance between the buckets that the hosts and the requesting device are assigned to (act 348). This sorted set of identified game sessions are then returned to the requesting device (act 350).

Alternatively, rather than sorting the set of identified game sessions at match making system 104, the information used to sort the set (e.g., the proximity measures) can be transmitted to the requesting device. The requesting device can then perform the sorting using the information it received from match making system 104.

It should be noted that the acts of FIGS. 5 and 6 are illustrated in a particular order for purposes of ease in explanation, and that the acts can be performed in different orders. It should also be noted that two or more acts can be performed concurrently. For example, in FIG. 5 act 306 may be performed before act 304, after act 304, or concurrently with act 304. By way of another example, in FIG. 6, act 346 may be performed before act 344, after act 344, or concurrently with act 344.

Figure 7:
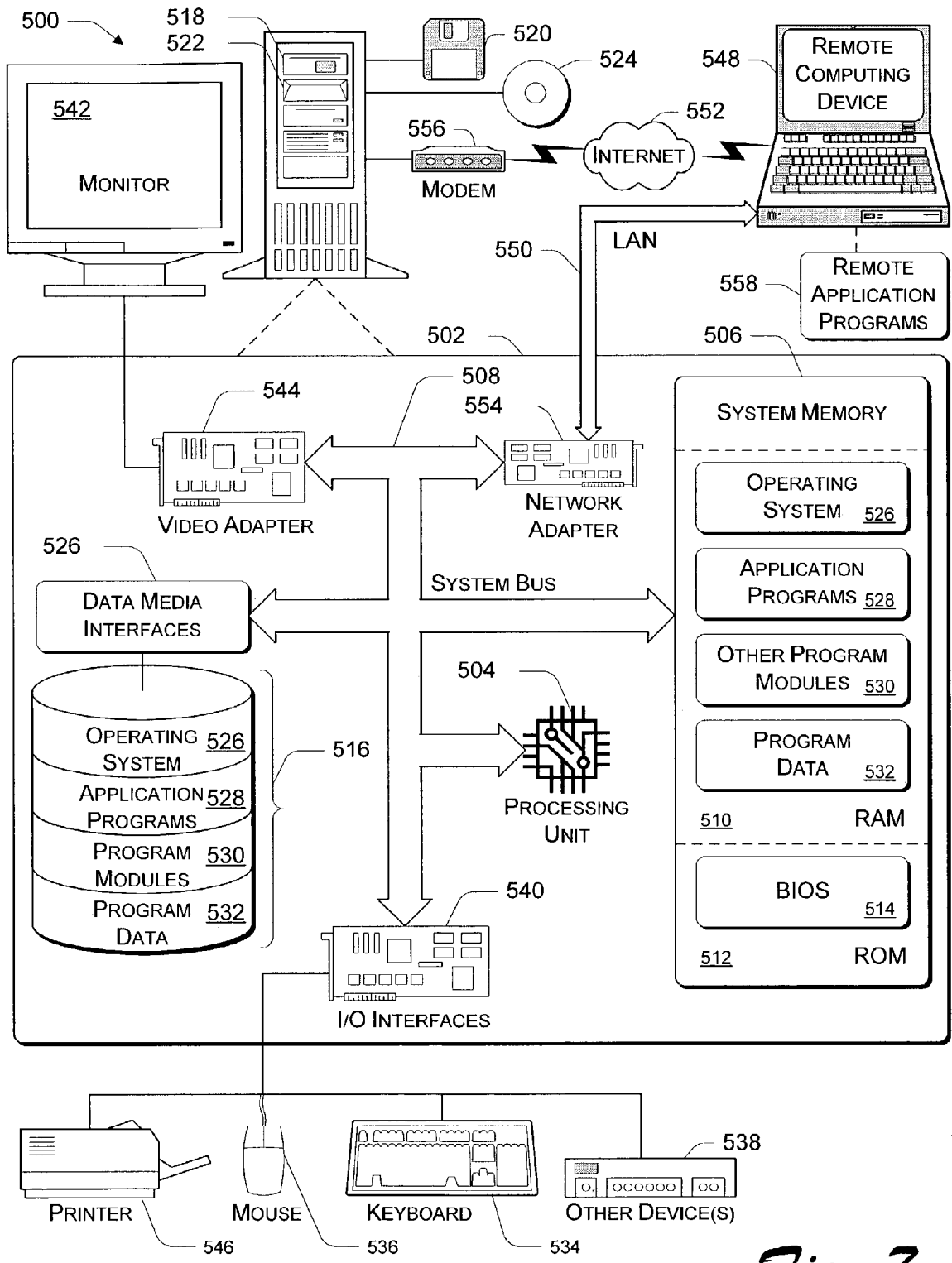
FIG. 7 illustrates a general computer environment, which can be used to implement the techniques described herein.

FIG. 7 illustrates a general computer environment 500, which can be used to implement the techniques described herein. The computer environment 500 is is only one example of a computing environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

Computer environment 500 includes a general-purpose computing device in the form of a computer 502. Computer 502 can be, for example, a computing device 102 of FIG. 1, or a match making system 104 of FIG. 1 or FIG. 2. The components of computer 502 can include, but are not limited to, one or more processors or processing units 504 (optionally including a cryptographic processor or co-processor, or a security processor or co-processor), a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 7 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, game console, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Figure 8:
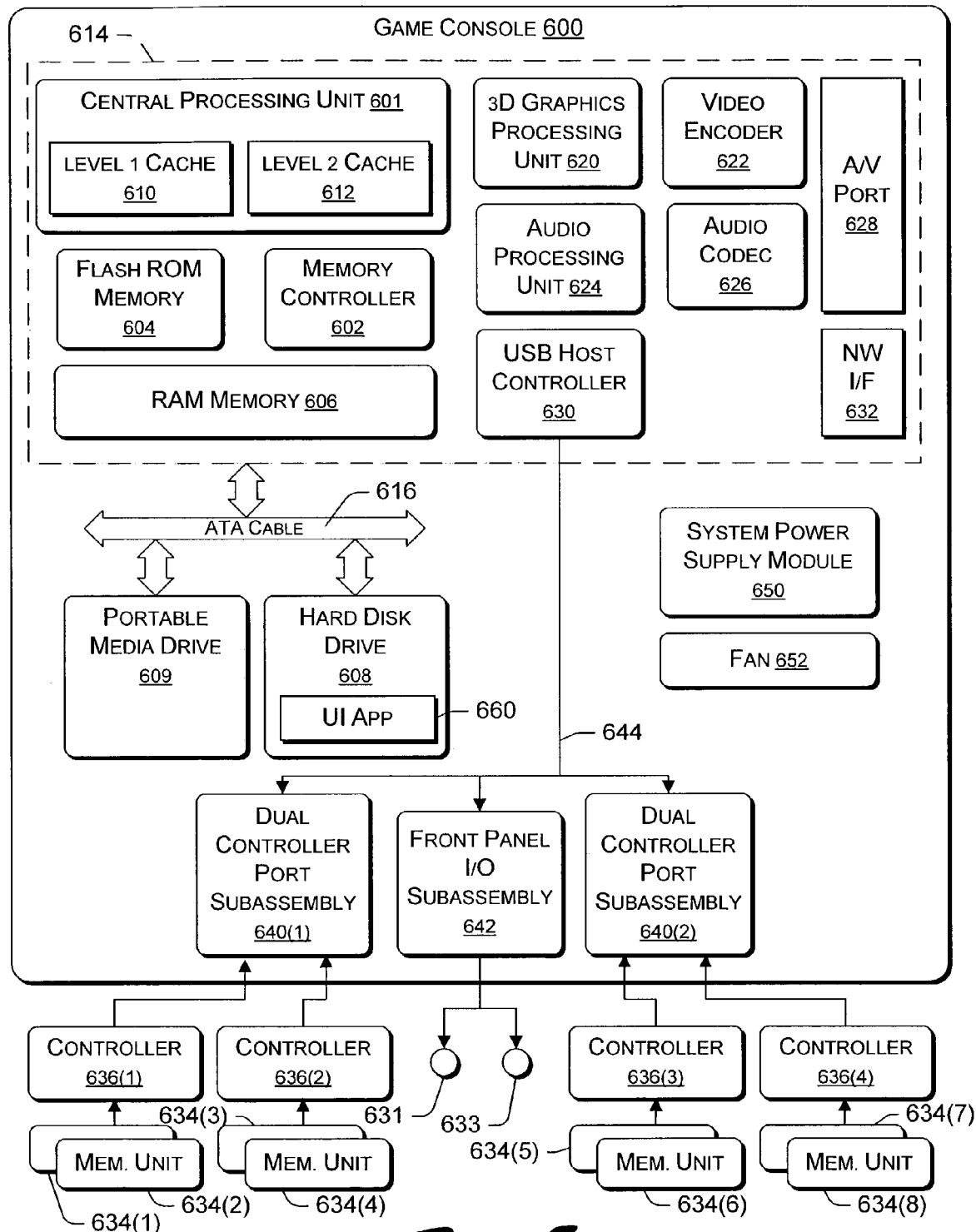
FIG. 8 shows functional components of a game console in more detail.

FIG. 8 shows functional components of a game console 600 in more detail. Game console 600 can be used, for example, as a computing device 102 of FIG. 1. Game console 600 has a central processing unit (CPU) 601 and a memory controller 602 that facilitates processor access to various types of memory, including a flash ROM (Read Only Memory) 604, a RAM (Random Access Memory) 606, a hard disk drive 608, and a portable media drive 609. CPU 601 is equipped with a level 1 cache 610 and a level 2 cache 612 to temporarily store data and hence reduce the number of memory access cycles, thereby improving processing speed and throughput.

CPU 601, memory controller 602, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, CPU 601, memory controller 602, ROM 604, and RAM 606 are integrated onto a common module 614. In this implementation, ROM 604 is configured as a flash ROM that is connected to the memory controller 602 via a PCI (Peripheral Component Interconnect) bus and a ROM bus (neither of which are shown). RAM 606 is configured as multiple DDR SDRAM (Double Data Rate Synchronous Dynamic RAM) that are independently controlled by the memory controller 602 via separate buses (not shown). The hard disk drive 608 and portable media drive 609 are connected to the memory controller via the PCI bus and an ATA (AT Attachment) bus 616.

A 3D graphics processing unit 620 and a video encoder 622 form a video processing pipeline for high speed and high resolution graphics processing. Data carried from the graphics processing unit 620 to the video encoder 622 via a digital video bus (not shown). An audio processing unit 224 and an audio codec (coder/decoder) 626 form a corresponding audio processing pipeline with high fidelity and stereo processing. Audio data is carried between the audio processing unit 624 and the audio codec 626 via a communication link (not shown). The video and audio processing pipelines output data to an A/V (audio/video) port 628 for transmission to the television or other display. In the illustrated implementation, the video and audio processing components 620-628 are mounted on the module 614.

Also implemented on the module 614 are a USB host controller 630 and a network interface 632. The USB host controller 630 is coupled to the CPU 601 and the memory controller 602 via a bus (e.g., PCI bus) and serves as host for the peripheral controllers 636(1)-636(4). The network interface 232 provides access to a network (e.g., Internet, home network, etc.) and may be any of a variety of various wire or wireless interface components including an Ethernet card, a modem, a Bluetooth module, a cable modem, and the like.

The game console 600 has two dual controller support subassemblies 640(1) and 640(2), with each subassembly supporting two game controllers 636(1)-636(4). A front panel I/O subassembly 642 supports the functionality of a power button 631 and a media drive eject button 633, as well as any LEDs (light emitting diodes) or other indicators exposed on the outer surface of the game console. The subassemblies 640(1), 640(2), and 642 are coupled to the module 614 via one or more cable assemblies 644.

Eight memory units 634(1)-634(8) are illustrated as being connectable to the four controllers 636(1)-636(4), i.e., two memory units for each controller. Each memory unit 634 offers additional storage on which games, game parameters, and other data may be stored. When inserted into a controller, the memory unit 634 can be accessed by the memory controller 602.

A system power supply module 650 provides power to the components of the game console 600. A fan 652 cools the circuitry within the game console 600.

A console user interface (UT) application 660 is stored on the hard disk drive 608. When the game console is powered on, various portions of the console application 660 are loaded into RAM 606 and/or caches 610, 612 and executed on the CPU 601. Console application 660 presents a graphical user interface that provides a consistent user experience when navigating to different media types available on the game console.

Game console 600 implements a cryptography engine to perform common cryptographic functions, such as encryption, decryption, authentication, digital signing, hashing, and the like. The cryptography engine may be implemented as part of the CPU 601, or in software stored on the hard disk drive 608 that executes on the CPU, so that the CPU is configured to perform the cryptographic functions. Alternatively, a cryptographic processor or co-processor designed to perform the cryptographic functions may be included in game console 600.

Game console 600 may be operated as a standalone system by simply connecting the system to a television or other display. In this standalone mode, game console 600 allows one or more players to play games, watch movies, or listen to music. However, with the integration of broadband connectivity made available through the network interface 632, game console 600 may further be operated as a participant in online gaming, as discussed above.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
    receiving a request, from a computing device, for an identification of one or more online game sessions that satisfy one or more criteria;
    identifying a plurality of online game sessions that satisfy the one or more criteria;
    determining, for each of the plurality of online game sessions, a distance between the computing device and another computing device that hosts the online game session, the determining comprising:
        identifying a first bucket to which the computing device is assigned;
        identifying a second bucket to which the other computing device is assigned; and
        identifying a distance between the first and second buckets wherein the second bucket is formed by selecting a set of devices belonging to the first bucket and assigning the set of devices of the first bucket to the second bucket when the number of devices, each device having an IP address, assigned to the first bucket exceeds a bucket threshold, the bucket threshold being a predetermined number of IP addresses which can belong to the first bucket;
    selecting an order in which the plurality of online game sessions are to be presented at the computing device, wherein the order is based at least in part on the determined distances; and
    returning identifiers of the plurality of online game sessions to the computing device for presentation at the computing device in the selected order.

2. A method as recited in claim 1, wherein the determining comprises determining the distance without communicating directly with any of the computing devices, whereby the device is assigned to the nearest bucket as measured geographically when the device is not assigned to or is not within a geographical boundary of a bucket or the another device is assigned to the nearest bucket when the another device is not assigned to or is not within a geographical boundary of a bucket.

3. A method as recited in claim 1, wherein the second bucket is additionally formed by collecting a set of devices not belonging to the first bucket and second bucket.

4. A method as recited in claim 1, wherein approximately one-half of the devices in the first bucket are assigned to the second bucket when the second bucket is formed.

5. A method as recited in claim 1, wherein:
    the determining further comprises identifying an Internet provider for the computing device and an Internet provider for the other computing device; and
    the selecting further comprises selecting the order based at least in part on whether the Internet provider for the computing device is the same as the Internet provider for the other computing device.

6. A method as recited in claim 1, wherein determining the distance between the computing device and the other computing device comprises accounting for different data transfer rates in different parts of a network via which communication between the computing device and the other computing device occurs, wherein the first bucket belongs to a first layer and the second bucket belongs to a second layer such that a layer is a collection of buckets, and wherein layers are one of the criteria with which to identify online game sessions.

7. A method as recited in claim 6, wherein the network comprises the Internet.

8. A method as recited in claim 1, wherein the computing device comprises a first game console and the other computing device comprises a second game console.

9. A method as recited in claim 1, wherein the method is implemented in a match making system separate from both the computing device and the other computing device.

10. A method as recited in claim 1, wherein the one or more online game sessions comprise short-lived game sessions.

11. A method as recited in claim 1, wherein the one or more online game sessions comprise tournament game sessions.

12. One or more computer readable media having stored thereon a plurality of instructions that, when executed by one or more processors, causes the one or more processors to perform a method, the method comprising:
    maintaining a record of spatial distances between groups of network addresses, wherein each spatial distance is measured between a center of each group, wherein the center of each group is an IP population center of each group where the IP population refers to a number of IP addresses, wherein each group belongs to a layer where a layer is a collection of groups of network addresses, and wherein layers are one of a set of criteria with which to identify current online game sessions; and
    selecting and ordering a set of current online game sessions, based at least in part on the record, when a computing device requests information regarding current online game sessions.

13. One or more computer readable media as recited in claim 12, wherein the one or more processors are implemented in a match making system separate from the computing device and wherein approximately one-half of the devices in a first group are assigned to a second group when the second group is formed such that the first group is a first geographic region and the second group is a second geographic region.

14. One or more computer readable media as recited in claim 12, wherein the computing device comprises a game console, and wherein a new group of game sessions is formed from other groups of current online game sessions when the number of current online game sessions in any one of the existing groups exceeds a group threshold value.

15. One or more computer readable media as recited in claim 12, wherein the distances between groups of network addresses are based at least in part on different data transfer rates in different parts of a network via which communication between devices assigned the network addresses occurs.

16. One or more computer readable media as recited in claim 12, wherein the distances between groups of network addresses are based at least in part on latitude and longitude values of geographic locations of devices assigned the network addresses.

17. One or more computer readable media as recited in claim 12, wherein the record comprises a table wherein a second group is formed by collecting a set of devices belonging to a first group and assigning the set of devices to the second group when the number of devices, each having an IP address, assigned to the first group exceeds a group threshold, the group threshold being a predetermined number of IP addresses which can belong to a group.

18. One or more computer readable media as recited in claim 12, wherein the method further comprises:
    maintaining a record of Internet providers of the network addresses; and
    selecting the ordering based at least in part on both the record of distances and the record of Internet providers.

19. One or more computer readable media as recited in claim 12, wherein the current online game sessions comprise one or more of short-lived game sessions and persistent game sessions.

20. A method comprising:
    identifying a plurality of online game sessions, wherein one of a plurality of computing devices is part of each of the online game sessions;
    determining distances between a game console and each of the plurality of computing devices, the distances being based at least in part on different data transfer rates in different parts of a network via which communication between the game console and the plurality of computing devices occurs, wherein each computing device belongs to one of a plurality of buckets, and wherein each bucket belongs to one of a plurality of layers such that a layer is a collection of buckets; and
    determining an ordering for the plurality of online game sessions, wherein the ordering is based at least in part on the distances, wherein the ordering is based at least in part on distances between the plurality of buckets and on distances between the plurality of layers, and wherein the ordering is determined without any communication between the game console and the plurality of computing devices.

21. A method as recited in claim 20, wherein the method is implemented in a match making system separate from the plurality of computing devices.

22. A method as recited in claim 20, wherein one of the plurality of computing devices comprises a game console, and wherein an additional bucket is formed by assigning a set of the computing devices to the additional bucket when the number of computing devices in any one of the plurality of buckets exceeds a bucket threshold value.

23. A method as recited in claim 22, wherein the distances are based at least in part on latitude and longitude values of geographic locations of the game console and the plurality of computing devices, wherein the additional bucket is formed by assigning a portion of the computing devices of a bucket having the most computing devices to the additional bucket.

24. A method as recited in claim 20, wherein the distances are maintained in a table, and wherein a computing device is assigned to a bucket which is geographically closest to the computing device when the computing device is assigned to a bucket and when the computing device is not within geographic boundaries of any of the buckets.

25. A method as recited in claim 20, wherein the ordering is further based at least in part on an Internet provider of the game console and Internet providers of each of the plurality of computing devices.

26. A method as recited in claim 20, wherein the plurality of online game sessions comprise tournament game sessions.

27. A method as recited in claim 20, wherein the plurality of online game sessions comprise game sessions for which no computing device is currently playing in an individual game play session of the game session.

28. A system comprising:
    an interface to allow communication with a network; and
    a processing unit configured to:
        request information from a match making service regarding current online game sessions, wherein the match making service is coupled to the system via the network, wherein each online game session belongs to one of a plurality of buckets and to one of a plurality of layers;
        receive, from the match making service, an indication of a plurality of current online game sessions; and
        present, in an order based at least in part on distances between the system and other devices that are part of the plurality of current online game sessions, at least a subset of the plurality of current online game sessions, wherein the distances are based at least in part on different data transfer rates in different parts of the network, and wherein the order is also based at least in part on a distance between buckets and on a distance between layers.

29. A system as recited in claim 28, wherein the system comprises a game console, and wherein an additional bucket is formed when the number of online game sessions belonging to any one of the buckets exceeds a bucket threshold value.

30. A system as recited in claim 28, wherein the system comprises a display and wherein the processor is to present the subset via the display, and wherein the system is assigned to the nearest bucket as measured geographically when the system is not assigned to or is not within a geographical boundary of a bucket.

31. A system as recited in claim 28, wherein the processing unit is further to receive, from the match making service, the order for the plurality of current online game sessions.

32. A system as recited in claim 28, wherein the network comprises the Internet.

33. A system as recited in claim 29, wherein the distances are based at least in part on latitude and longitude values of geographic locations of the system and the other devices, and wherein the additional bucket is assigned approximately half of the number of online game sessions belonging to the bucket which has assigned a number of online game sessions which exceeds the bucket threshold value.

34. A system as recited in claim 28, wherein the order is further based at least in part on an Internet provider of the system and Internet providers of each of the other devices.

35. One or more computer readable media having stored thereon a plurality of instructions that, when executed by one or more processors, causes the one or more processors to perform a method, the method comprising:
    obtaining, from a match making service over a network, a list of multiple online game sessions that may be joined; and
    presenting to a user identifiers of the multiple online game sessions in an order that is based at least in part on distances between the one or more processors and each of a plurality of computing devices that are part of one of the multiple online game sessions, wherein the distances are based at least in part on (1) different data transfer rates in different parts of the (2) a distance between a bucket to which the one or more processors is assigned and a bucket to which each computing device is assigned, and (3) a distance between a layer to which the one or more processors is assigned and a layer to which each computing device is assigned, each game session being assigned to one of a plurality of buckets and to one of a plurality of a plurality of layers.

36. One or more computer readable media as recited in claim 35, wherein the distances are based at least in part on latitude and longitude values of the one or more processors and latitude and longitude values of each of the plurality of computing devices.

37. One or more computer readable media as recited in claim 35, wherein the order is further based at least in part on Internet providers of each of the plurality of computing devices.

38. One or more computer readable media as recited in claim 35, wherein the one or more processors are part of a game console.

39. One or more computer readable media as recited in claim 38, wherein the multiple online game sessions include comprise one or more of short-lived game sessions and persistent game sessions.

40. A method comprising:
receiving a request, from a computing device, for an identification of one or more online game sessions that satisfy one or more criteria;
identifying a plurality of online game sessions that satisfy the one or more criteria;
determining, for each of the plurality of online game sessions, a first distance and a second distance between the computing device and another computing device that is part of the online game session, the determining comprising:
identifying a first bucket of a first layer to which the computing device is assigned, and a second bucket of a second layer to which the computing device is assigned, wherein a layer is a collection of buckets;
identifying a third bucket of the first layer to which the other computing device is assigned, and a fourth bucket of the second layer to which the other computing device is assigned;
identifying the first distance between the first and third buckets; and
identifying the second distance between the second and fourth buckets;
selecting an order in which the plurality of online game sessions are to be presented at the computing device, wherein the order is based at least in part on both the first distance and the second distance; and
returning identifiers of the plurality of online game sessions to the computing device for presentation at the computing device in the selected order.

41. A method comprising:
receiving a request, from a computing device, for an identification of one or more online game sessions that satisfy one or more criteria;
identifying a plurality of online game sessions that satisfy the one or more criteria;
determining, for each of the plurality of online game sessions, a spatial distance between the computing device and another computing device that is part of the online game session, the spatial distance being determined without communicating directly with any of the computing devices;
determining, for each of the plurality of online game sessions, a bucket distance between a bucket to which the computing device is assigned and another bucket to which the another computing device is assigned, the bucket distance being determined without communicating directly with any of the computing devices;
determining, for each of the plurality of online game sessions, a layer distance between a layer to which the computing device is assigned and another layer to which the another computing device is assigned, the layer distance being determined without communicating directly with any of the computing devices;
selecting an order in which the plurality of online game sessions are to be presented at the computing device, wherein the order is based at least in part on the spatial distances, the bucket distances, and the layer distances; and
returning identifiers of the plurality of online game sessions to the computing device for presentation at the computing device in the selected order.

* * * * *

UNITED STATES PATENT AND TRADEMARK OFFICE
CERTIFICATE OF CORRECTION

| | | |
|---|---|---|
| PATENT NO. | : 7,634,569 B2 | Page 1 of 1 |
| APPLICATION NO. | : 10/421073 | |
| DATED | : December 15, 2009 | |
| INVENTOR(S) | : Mark D. VanAntwerp et al. | |

It is certified that error appears in the above-identified patent and that said Letters Patent is hereby corrected as shown below:

In column 14, line 5, after "Data" insert -- is --.

In column 18, line 55, in Claim 35, after "of the" insert -- network, --.

In column 19, line 9, in Claim 39, after "sessions" delete "include".

Signed and Sealed this
Tenth Day of May, 2011

David J. Kappos
*Director of the United States Patent and Trademark Office*